US011352963B2

(12) United States Patent
Fluhler

(10) Patent No.: US 11,352,963 B2
(45) Date of Patent: Jun. 7, 2022

(54) INTERNAL COMBUSTION ENGINE WITH IMPROVED EFFICIENCY

(71) Applicant: Herbert U. Fluhler, Huntsville, AL (US)

(72) Inventor: Herbert U. Fluhler, Huntsville, AL (US)

(*) Notice: Subject to any disclaimer, the term of this patent is extended or adjusted under 35 U.S.C. 154(b) by 120 days.

(21) Appl. No.: 16/125,643

(22) Filed: Sep. 7, 2018

(65) Prior Publication Data
US 2019/0003405 A1 Jan. 3, 2019

Related U.S. Application Data

(63) Continuation-in-part of application No. 14/078,182, filed on Nov. 12, 2013, now abandoned, which is a continuation of application No. 12/398,182, filed on Mar. 5, 2009, now Pat. No. 8,578,695.

(60) Provisional application No. 61/134,324, filed on Jul. 9, 2008, provisional application No. 61/190,982, filed on Sep. 4, 2008.

(51) Int. Cl.
F02B 39/10 (2006.01)
F02D 15/00 (2006.01)
F02G 3/00 (2006.01)
F02B 37/00 (2006.01)
F02B 53/00 (2006.01)

(52) U.S. Cl.
CPC ............ F02D 15/00 (2013.01); F02B 37/001 (2013.01); F02B 39/10 (2013.01); F02G 3/00 (2013.01); F02B 2053/005 (2013.01)

(58) Field of Classification Search
CPC ........ F02D 15/00; F02B 37/001; F02B 39/10; F02B 21/00; F02B 41/10; F02M 35/10026; F02M 35/10157
See application file for complete search history.

(56) References Cited

U.S. PATENT DOCUMENTS

| 4,294,073 | A | * | 10/1981 | Neff | F02B 37/02 60/597 |
| 4,850,193 | A | * | 7/1989 | Kawamura | F02B 39/10 60/608 |
| 5,246,338 | A | * | 9/1993 | Takayanagi | F01D 25/30 415/208.1 |
| 6,256,990 | B1 | * | 7/2001 | Itoh | F02B 67/10 60/597 |
| 9,109,502 | B1 | * | 8/2015 | Hall | F02B 39/10 |
| 2005/0000217 | A1 | * | 1/2005 | Nau | F02B 39/10 60/612 |
| 2007/0137626 | A1 | * | 6/2007 | Turner | F02B 39/10 123/559.1 |
| 2008/0041323 | A1 | * | 2/2008 | Clark | F02B 39/10 123/3 |
| 2009/0025696 | A1 | * | 1/2009 | Lovgren | F02B 39/10 123/559.1 |
| 2010/0155157 | A1 | * | 6/2010 | Grieve | F02B 39/10 123/565 |

(Continued)

Primary Examiner — Ngoc T Nguyen
(74) Attorney, Agent, or Firm — Tomas Friend

(57) ABSTRACT

A reciprocating, internal combustion engine comprises a turbine connected to the exhaust port of a cylinder. The turbine receives exhaust gas from the cylinder and a power capture means transfers the power generated by the turbine to at least one of power storage device, a turbocharger, a compressor, and vehicle locomotion.

5 Claims, 3 Drawing Sheets

(56) References Cited

U.S. PATENT DOCUMENTS

| | | | |
|---|---|---|---|
| 2012/0137681 A1* | 6/2012 | Hoess | F02B 39/10 123/559.1 |
| 2016/0076469 A1* | 3/2016 | Pursifull | F02M 35/10222 123/519 |
| 2016/0123223 A1* | 5/2016 | Brown | F02B 39/10 415/122.1 |
| 2016/0138466 A1* | 5/2016 | Ge | B60W 10/06 60/624 |
| 2020/0386148 A1* | 12/2020 | Larsson | F01D 25/24 |

* cited by examiner

INTERNAL COMBUSTION ENGINE WITH IMPROVED EFFICIENCY

CROSS REFERENCE TO RELATED APPLICATIONS

This application is a Continuation-In-Part-of U.S. Ser. No. 14/078,072, which claims priority to U.S. Ser. No 12/398,182, filed Mar. 5, 2009 and issued as U.S. Pat. No. 8,578,695. U.S. Ser. No. 12/398,182 claims the benefit of U.S. provisional application 61/134,324, filed Jul. 9, 2008, and U.S. provisional application 61/190,982, filed Sep. 4, 2008.

BACKGROUND OF THE INVENTION

Field of the Invention

This application relates to thermal engine efficiency, and more particularly to an internal combustion engine having improved thermal engine efficiency.

Description of Related Art

U.S. Pat. No. 7,441,530 and US 2007/0227347 disclose methods for improving the efficiency of a reciprocating-piston engine that includes a gas exerting a conservative force on a piston resulting from a change in volume of the gas arising from a change in position of the piston during a cycle of operation of the engine. The improvement comprises a mechanism that counters the conservative force with a counterforce acting on the piston at each point in the engine operation cycle. The counterforce is produced by a position-dependent force, such as gravity, charge, magnetism, and compression acting on the mechanism.

U.S. Pat. No. 4,958,497 discloses a turbocharger drive system associated with an internal combustion engine that includes turbochargers connected in series (i.e. a multistage turbocharger) and sequentially driven by exhaust gases from the engine. Rotary electric machines mounted on shafts of the turbochargers operate as electric motors or generators. When the engine rotates at a low speed and under a high load, the rotary electric machine coupled to the engine shaft operates as an electric generator to generate electric power to drive the rotary electric machines mounted on the turbocharger shafts as electric motors to boost pressure into the air intake. When the engine rotates at a high speed, the rotary electric machines combined with the turbochargers generate electric power to drive the rotary electric machine coupled to the engine shaft as an electric motor to convert some of the exhaust energy into engine output power.

Despite the existence of the above methods, the need for internal combustion engines with improved efficiency and methods for obtaining higher efficiency from internal combustion engines remains.

BRIEF SUMMARY OF THE INVENTION

In one aspect, the present invention provides for an internal combustion engine having improved efficiency. In another aspect, the invention provides for a method of improving the efficiency of existing internal combustion engines. These and other aspects of the invention are explained in the following description of the invention.

BRIEF DESCRIPTION OF THE DRAWINGS

The elements of the drawings are not necessarily to scale relative to each other, with emphasis placed instead upon clearly illustrating the principles of the disclosure. Like reference numerals designate corresponding parts throughout the several views of the drawings in which.

DETAILED DESCRIPTION OF THE INVENTION

Figure 1:
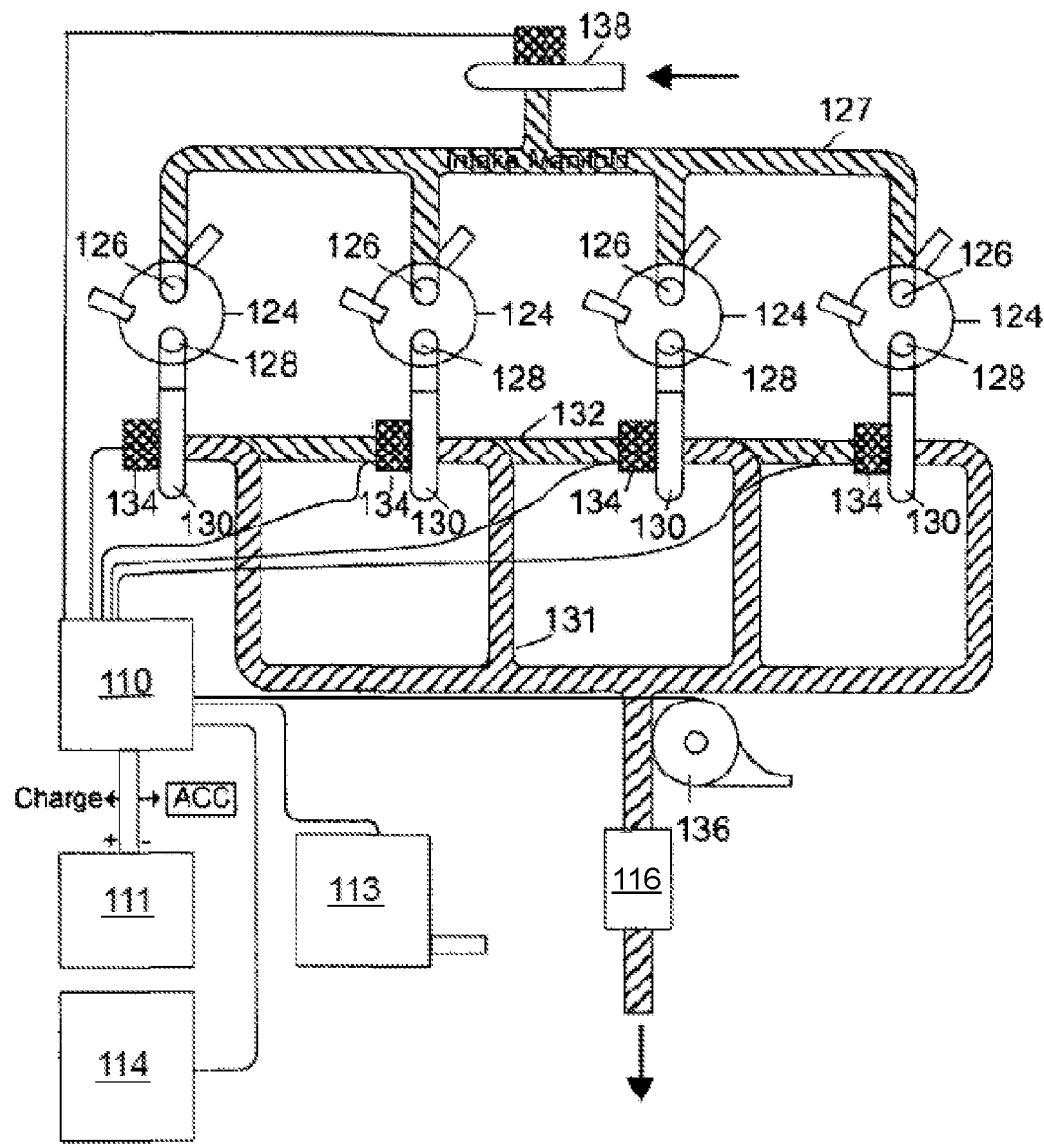
FIG. 1 is a schematic of a 4-cylinder embodiment of an engine according to the invention.

The compression ratio of an engine need not be the same as the expansion ratio and the expansion ratio should be made as large as possible in relation to the compression ratio to maximize efficiency. Decoupling of the compression ratio from the expansion ratio enables a dramatic increase in the efficiency of a thermal engine. One of the draw backs to decoupled compression and expansion ratios is that it typically results in the need to develop substantially a new engine. There are some means by which an engine might be retrofit to accommodate this requirement, but they are difficult, complicated and amount essentially to an entire engine rebuild. A new arrangement, connectivity, and use of automotive turbo chargers according to the present invention provides an alternative solution to achieving the functional decoupling of compression and expansion ratios.

Operation of the conventional turbo charger is well known and well understood. Essentially an exhaust plenum collects the spent exhaust flow from the cylinders in the engine, and directs the flow to a common turbine that then drives a compressor which, in turn, pressurizes intake air. The pressurized intake air flows more volume through the intake system and over charges the cylinder with air or air/fuel mixture and, with a greater charge, increases the power output of the engine. This configuration and function does not, however, decouple the compression and expansion ratios so much potential increases is efficiency improvement is untapped. The inventor has determined that is because the turbine is in the wrong position to effect significant improvements in efficiency and that changing the position of the turbine can result in a functional decoupling of compression and expansion ratios in a way that dramatically improves engine efficiency.

Currently turbines are positioned so far down stream of the exhaust valve (128), that only a relatively low static pressure and some minimal dynamic pressure remain in the exhaust flow to power a turbo charger. This is ideal for turbo charger applications because a compressor could not use much more power than what is generated in conventional turbo charger turbines. Doing so would overcharge the input stroke of the engine causing pre-detonation, or over stressing of the engine The present invention is based, at east in part, on minimizing the distance between the exhaust port (128) and the turbine (130), to minimize the volume through which exhaust passes from one to the other to increase engine efficiency. Before the exhaust valve opens, there is a significant high static pressure inside the cylinder with the piston at near Bottom Dead Center (BDC), often hundreds of PSI of pressure. When the exhaust valves opens, there is a large loss of enthalpy and therefore a large loss of energy that could have been recovered for additional useful work. Therefore, an engine according to the present invention places one or more turbines as close to the exhaust valve as possible, or integrates the turbine intake with the exhaust valve. The addition of the turbine to the exhaust port effectively increases the expansion ratio and thereby decouples it from the compression ratio. Placing the turbine very close to the pressurized exhaust gas minimizes loss and maximizes the efficiency of the additional expansion ratio that extracts additional power. Furthermore, there is no significant increase in back pressure because, when the exhaust valve opens, the intake valve is still closed so that all the back force is applied only to the piston at BDC, and not back into the intake manifold (127). A number of alternative embodiments are disclosed in FIGS. 1-5.

FIG. 1 is a schematic of an embodiment of an internal combustion engine having four cylinders (124) connected through intake valves (126) to an air intake manifold (127) and connected through exhaust ports (128) and turbines (130) to an exhaust manifold (131). The turbines (130) may be directly connected to the exhaust ports (128) or be integral with the exhaust ports (128) and are functionally coupled to electrical generators (134), which provide electrical power to an electronic controller (110) comprising a processor and electrical control hardware that directs electrical power to one or more of a battery (111), an electric motor (113), an electrically powered compressor (138), electrically powered accessories, and a driver control module (114) comprising a processor and electrical hardware that accepts driver input directly or indirectly via programmed, preselected settings. For racing or other high performance applications, the compressor (13) may be a high pressure compressor providing, for example 80 p.s.i. and optionally connected to a source of oxidizer such as air or nitrous oxide.

Power generated by the turbines (130) may be used, for example as needed, to charge a battery that provides power to an electric motor that drives the turbocharger (136). In the case of a hybrid vehicle, a generator/alternator is coupled to the electronic controller (110) and the battery to provide electrical power to the electric motor (113) for vehicle locomotion. The electrical power generated may be used to drive other accessories in any combination. The electronic controller (110) monitors and controls and routes electric power as needed and/or directed by the driver control module (114). In addition to or as an alternative to the electrically powered compressor (138), electrical power may be delivered to a turbocharger (136) that charges the intake manifold (127) with air pulled in through an air filter. The turbocharger (136) shown in FIG. 1 may be electrically powered or a conventional turbocharger that is driven by exhaust gas downstream of the convergence of exhaust streams of individual cylinders. Additionally or alternatively, a turbocharger may operate in a semi-conventional manner, delivering a higher than normal pressure to the intake manifold or directly to one or more intake ports (126).

In alternative embodiments, a hydraulic system or a pneumatic system may be used in place of the electrical system, collectively power capture means (115, FIGS. 3A, B), to capture the power of the turbines and route that power for a useful purpose, such as driving a hydraulically or pneumatically powered compressor, turbocharger, drive shaft, or power take-off. Additionally or alternatively, a mechanical linkage may be provided, optionally comprising a torque converter and/or a variable ratio transmission, to couple the extra extracted power to the drive train as another power capture means (115).

To minimize the volume in the exhaust pipe between the exhaust valve (128) and the turbine-alternator/generator (134), nominally a separate turbine is needed for each cylinder (124), and these may in turn have individual alternator/generators (134) or the turbines (130) could be ganged on a shaft to a common generator or drive train for mechanical coupling to the drive train. In the case of a V-like piston arrangement, the turbine (130) may be placed between cylinders and service the exhaust ports/valves (128) of both cylinders (124), thus requiring only one turbine for the two cylinders.

Figure 2A:
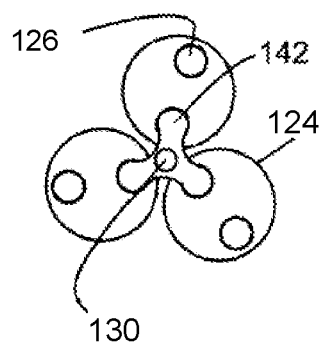
FIGS. 2A and B are schematics of embodiments having multiple exhaust ports connected to a single turbine.
Figure 2B:
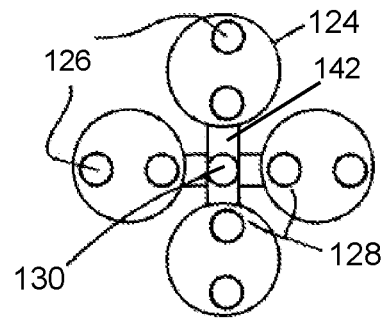

FIGS. 2A and B are schematics showing embodiments in which three or four cylinders (124) are optimally laid out to minimize the distance (and hence volume) from each associated exhaust port (128) to a singular turbine entry port, thereby reducing enthalpy loss and maximizing efficiency. The volume of the connecting manifold (142) connecting the exhaust port(s) (128) to the turbine(s) (130) is preferably less than the displacement volume of a single cylinder and more preferably less than half the displacement volume of a single cylinder. This arrangement is distinct from conventional turbo chargers, which are located at a singular output junction of a combining exhaust manifold. Such a manifold encloses a volume, much larger than the cylinders, rendering significant efficiency extraction impossible.

Figure 3A:
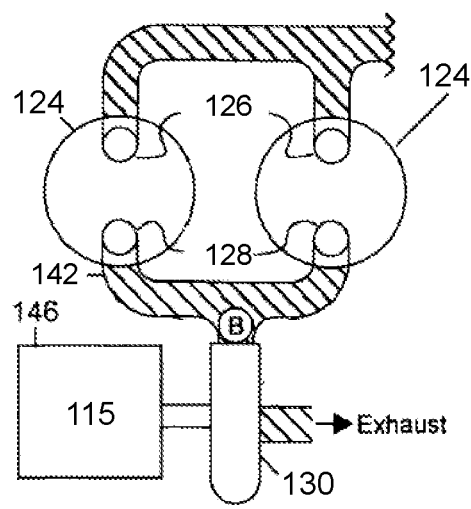
FIGS. 3A and B are schematics of embodiments having one turbine connected to two exhaust ports.
Figure 3B:
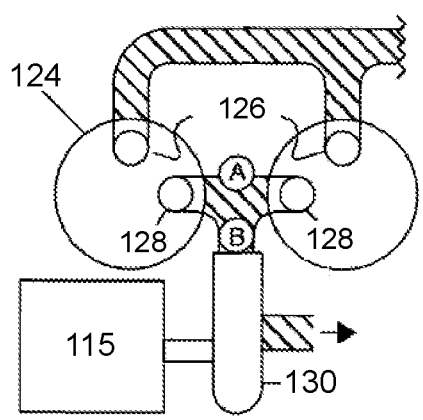

FIGS. 3A and B are schematics showing two alternative configurations for embodiments having two exhaust ports (128) connected to a single turbine (130). An advantage of the configuration shown in FIG. 3B is that the exhaust ports (128) are closer together so that the volume of the connecting manifold (142) may be made smaller than the same manifold in FIG. 3A. The volume of the connecting manifold (142) is to be minimized to achieve maximum increase in efficiency.

Figure 4:
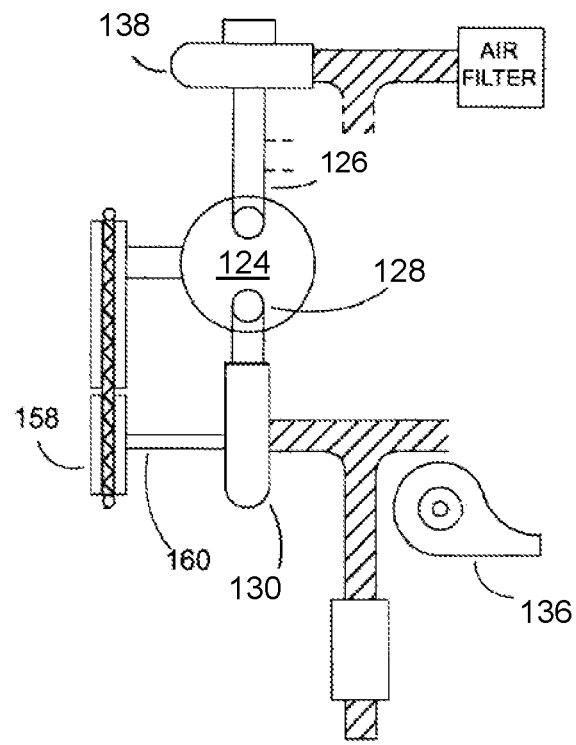
FIG. 4 is a schematic of an embodiment comprising a mechanical drive connected to a turbine.
Figure 5:
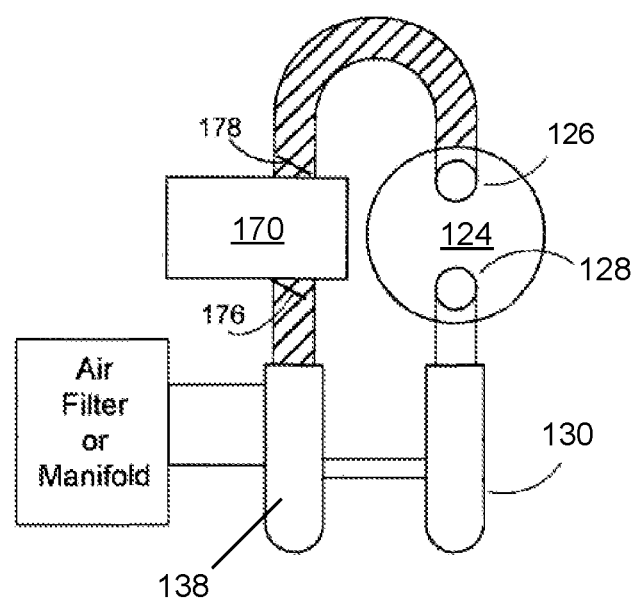
FIG. 5 is a schematic of an embodiment in which an intake stroke is also a power stroke.

FIG. 4 is a schematic of an embodiment of the invention comprising a mechanical drive linkage (158), which may comprise pulleys or gears, for example, that is driven by a shaft (160) of turbine (130) connected directly to an exhaust port (128). The mechanical drive linkage (158) may optionally comprise a variable ratio transmission. Power delivered by the mechanical drive linkage (158) may be coupled to the drive mechanism of the vehicle for locomotion, for example via belt or chain coupled to a crankshaft. Additionally or alternatively, the power may be used to drive a compressor (138) and/or a turbocharger (136). Several turbines may be connected to a common shaft (160).

An optional second turbine may be added downstream of the exhaust port turbine (130) to recover sufficient power to service the low power needs of a traditional input compressor in a conventional turbocharger architecture and arrangement. The exhaust is typically routed to an emission control device (142) such as a catalytic converter, and thence to the exhaust pipe (148).

Embodiments of the present invention allow an internal combustion engine to have an intake stroke that is also a power stroke. For example, a diesel or direct injection engine according to the present invention may comprise a plenum (170) (FIG. 5) or other pressure storage device that is pre-charged by a compressor (138) between cycles with a predetermined amount of air. Just before the intake valve opens, the plenum is at a highest pressure and pressurized air is forced through the intake valve to press down on the piston during the intake stroke. At the end of the intake stroke the plenum is expended and has a lower pressure than when starting the intake stroke. At this point the intake valve remains open for at least a part of the return, compression, stroke ending at Top Dead Center (TDC). The flow of air into and out of the plenum (170) may additionally or alternatively be controlled by control valves (176 and 178). In this way, some of the ingested air is allowed to return back into the intake plenum from the cylinder. This reduces the amount of air that must undergo compression in the cylinder during cruising operation and reduces power required to complete compression.

Several examples have been used to describe the invention but the invention is not intended to be limited to the examples provided. It is to be understood that the invention applies to two stroke as well as four stroke engines and to engines that use, for example, gasoline, methane, propane, ethanol, diesel, and combinations thereof as fuel. Engines according to the invention may comprise from one to twelve or more cylinders and may be aspirated, direct injected, or fuel injected engines.

The invention claimed is:

1. A reciprocating, internal combustion engine, said engine comprising:
   a cylinder comprising an intake port and an exhaust port;
   a turbine connected to the exhaust port and configured to receive exhaust gas from the cylinder to drive the turbine;
   an electrical generator connected to the turbine;
   an electronic controller connected to the electrical generator; and
   a battery connected to the electrical generator and electronic controller
   wherein the combination of said electrical generator, said electronic controller, and the battery are configured to transfer power generated by the turbine to at least one of the battery, a turbocharger, a compressor, and an electric motor and
   wherein the turbine is integral with the exhaust port and exhaust passes through the turbine to enter into an exhaust manifold.

2. A reciprocating, internal combustion engine, said engine comprising:
   two or more cylinders, each cylinder comprising an intake port and an exhaust port;
   a turbine connected to the exhaust ports of the at least two cylinders by a connecting manifold and configured to receive exhaust gas from the at least two cylinders to drive the turbine;
   an electrical generator connected to the turbine;
   an electronic controller connected to the electrical generator; and
   a battery connected to the electrical generator and electronic controller
   wherein the combination of said electrical generator, said electronic controller, and the battery are configured to transfer power generated by the turbine to at least one of the battery, a turbocharger, a compressor, and vehicle locomotion and
   wherein the connecting manifold has an internal volume that is less than a volume of one of the two or more cylinders.

3. The engine of claim 2, wherein the connecting manifold has an internal volume that is less than one half the volume of one of the two or more cylinders.

4. The engine of claim 2, wherein the turbine is positioned between the connecting manifold and an exhaust manifold such that exhaust from the two or more cylinders passes through the turbine before entering the exhaust manifold.

5. The engine of claim 4, wherein:
   the turbine is connected to an exhaust port of each of three cylinders by the connecting manifold to receive exhaust gas from each of the three cylinders to drive the turbine;
   the turbine is positioned between the connecting manifold and an exhaust manifold such that exhaust from the three cylinders passes through the turbine before entering the exhaust manifold; and
   the three cylinders, the three exhaust ports, and the connecting manifold are arranged to provide a same distance from each exhaust port to the turbine.

* * * * *